United States Patent [19]
Park et al.

[11] Patent Number: 5,726,543
[45] Date of Patent: Mar. 10, 1998

[54] SENSORLESS, BRUSHLESS DC MOTOR START-UP CIRCUIT USING INTERMITTENTLY-ACCELERATED-RATE CLOCK

[75] Inventors: Shi-Hong Park; Suk-Hoon Bahng, both of Seoul; Nam-Jin Kang, Inchon-jikalshi, all of Rep. of Korea

[73] Assignee: Samsung Electronics Co., Ltd., Suwon, Rep. of Korea

[21] Appl. No.: 608,074

[22] Filed: Feb. 28, 1996

[30] Foreign Application Priority Data

Aug. 23, 1995 [KR] Rep. of Korea ............ 95-26160

[51] Int. Cl.$^6$ ............................................. H02P 1/00
[52] U.S. Cl. ............................................. 318/254; 318/439
[58] Field of Search ..................... 318/254, 439, 318/138, 778–782, 445, 842–847, 902, 903, 907.5, 928

[56] References Cited

U.S. PATENT DOCUMENTS

| | | | |
|---|---|---|---|
| 5,298,838 | 3/1994 | Peters et al. | 318/138 |
| 5,350,988 | 9/1994 | Le | 318/254 X |
| 5,382,889 | 1/1995 | Peters et al. | 318/254 |
| 5,448,141 | 9/1995 | Kelley et al. | 318/254 |
| 5,481,167 | 1/1996 | Rohrbaugh et al. | 318/254 |

*Primary Examiner*—Jonathan Wysocki
*Attorney, Agent, or Firm*—Allen LeRoy Limberg

[57] ABSTRACT

A start-up circuit for a sensorless, brushless DC motor modifies a conventional start-up circuit to include an intermittently-accelerated-rate clock generator for supplying a clock signal intermittently accelerated in rate to a shift register that is connected as a ring counter for selectively generating three-phase commutation signals during start-up and six-phase phase commutation signals during running. The intermittently-accelerated-rate clock generator facilitates the start-up circuit increasing the magnitude of a back electromotive force by adjusting the rate of a starting clock during start-up of the motor, so as to be capable of both a normal start-up with a normal-rate clock signal and an accelerating start-up with an accelerated-rate clock signal. This permits a stable and rapid start-up without need for a microprocessor or complicated circuitry.

2 Claims, 5 Drawing Sheets

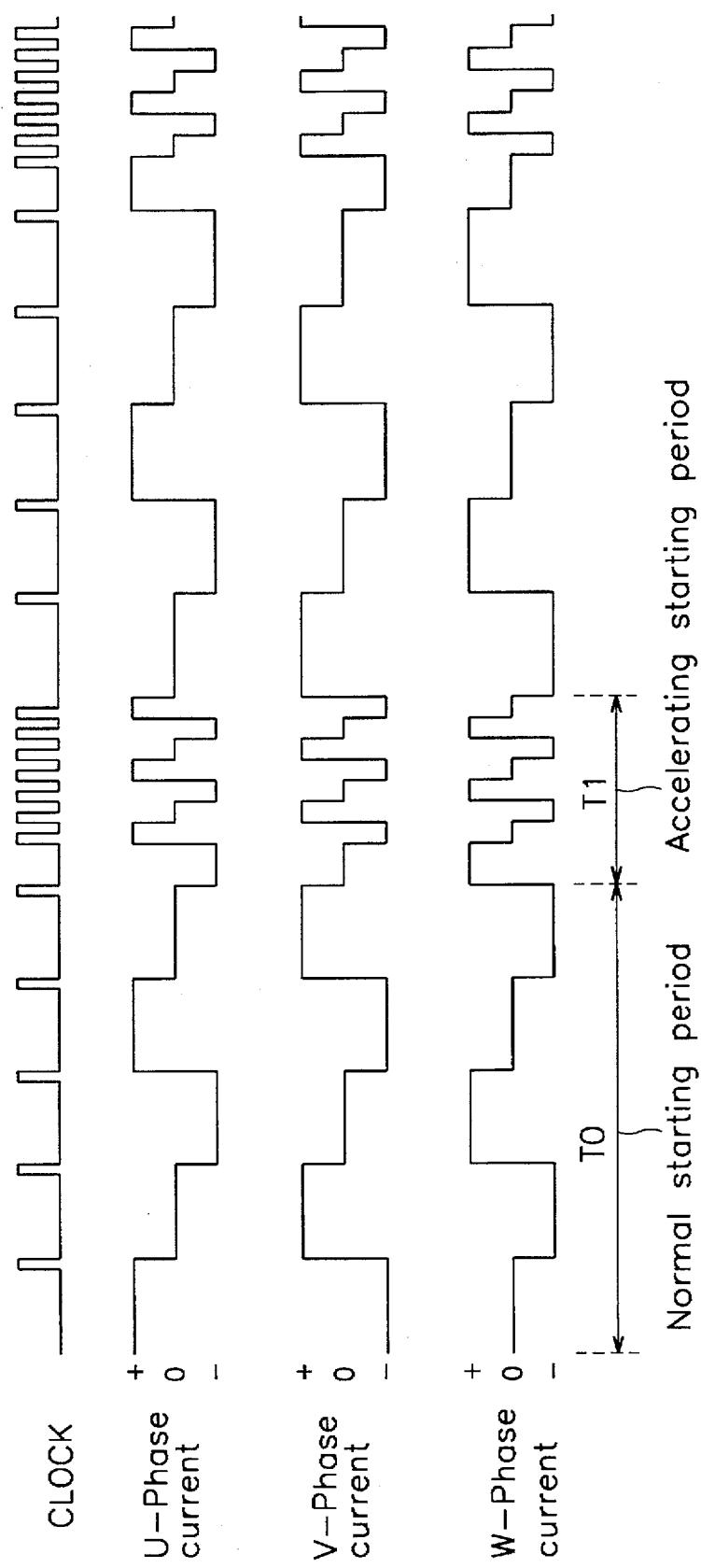

SENSORLESS, BRUSHLESS DC MOTOR START-UP CIRCUIT USING INTERMITTENTLY-ACCELERATED-RATE CLOCK

BACKGROUND OF THE INVENTION (1) Field of the Invention

The present invention relates to a start-up circuit for a sensorless, brushless DC motor using an adjustable-rate clock to clock a ring counter used to generate motor commutation signals and, more particularly, to a start-up circuit in which the adjustable-rate clock is intermittently accelerated in rate.

(2) Description of the Prior Art

A conventional start-up circuit for a three-phase sensorless, brushless DC motor is described below, with reference to the accompanying drawing in which FIG. 1 is a block diagram illustrating a conventional start-up circuit for a sensorless, brushless DC motor 00. Usually motors of this type can be thought of as having a stator with three field coils, generally connected in a wye configuration with a common voltage appearing at their interconnection point, although in practice a larger number of stator coils are usually employed with multiple motor poles. Typically, eight pole motors are used which have four electrical cycles per revolution of the rotor. However, the stator coils can still be analyzed in terms of three field coils connected in wye configuration, each comprising a respective set of four coils physically separated by 90° around the circumference of the stator.

In bipolar operation the stator coils are switched so that each conducts direct current flow in opposite directions at different times to cyclically produce forward-magnetizing, non-magnetizing and reverse-magnetizing conditions. In bipolar operation the stator coils are energized in sequences in each of which a current is established through two of the three field coils in the wye, with the third coil left unenergized. The sequences are arranged such that as the current paths through the field coils are changed, or commutated, a successive one of the coils is switched out of the current path, to be unenergized, and the previously unenergized coil is switched back into the current path. Furthermore, the sequence is defined such that when the unenergized coil is switched back into the current path, current will flow in the same direction as in the coil which was previously included in the current path, so field rotation (and consequently rotor rotation) will continue in the same direction. Accordingly, six commutation conditions are established for each electrical cycle in a three-phase DC motor when it is in running condition. During start-up, in order to increase starting torque, excitation of the stator field coils responsive to alternate ones of these six commutation conditions can be suppressed.

As shown in FIG. 1, a start-up circuit for a three-phase sensorless, brushless DC motor 00 includes a clock generator 10 for generating a clock of a constant frequency to drive the entire circuit; a shift register 20 connected as a ring counter and clocked by the clock of constant frequency supplied by the clock generator 10, for selectively generating a three-phase or a six-phase logic signal used to control commutation of the brushless DC motor 00 during start-up and during running, respectively; a back-electromotive-force signal amplifier 30 responsive to a non-excited-phase indication for selecting a back-electromotive-force signal generated in the currently non-excited winding of the motor 00 and amplifying that selected back-electromotive-force signal to supply an amplified back-electromotive-force signal; a back electromotive force detector 40 for detecting when the absolute amplitude of the amplified back-electromotive-force signal generated during start-up exceeds a prescribed threshold for switching commutation of the brushless DC motor 00 from start-up mode to running mode; a zero-crossing detector 50 responsive to the non-excited-phase indication for selecting an induced current signal or back-electromotive-force signal generated in the currently non-excited winding of the motor 00, and inferring a position of the motor rotor from the zero-crossing of that signal; a commutating and pre-driving circuit 60 for supplying response to the commutation logic signal supplied from the shift register 20 according to rotor position information supplied from the zero-crossing detector 50, for generating the non-excited-phase indications, and for providing a pre-driving function; and a three-phase driving output stage 70 for driving the stator field coils of the three-phase brushless DC motor responsive to output signal supplied from the commutating and pre-driving circuit 60.

In a start-up circuit as described thusfar, for a brushless DC motor 00 which is not provided with a special rotor position sensor such as a Hall device or photosensing device and so is denominated as being "sensorless", the start-up circuit extracts rotor position information from zero crossings of an induced winding current or of a back electromotive force which is generated when the rotor of the motor 00 rotates.

However, since the induced winding current or back electromotive force is not generated when the rotor is not rotating, the start-up circuit synchronously compulsorily starts the motor 00 by using an additional oscillator to apply oscillations to a sequentially selected pair of the stator field coils generating a back electromotive force by transformer action in the other of the stator field coils. The magnitude of the back electromotive force is evaluated to determine whether self-commutation is achieved. While evaluating the self-commutation proceeding from the back electromotive force, the motor 00 can be continuously accelerated. When it is sensed that the magnitude of the back electromotive force has reached or exceeds a prescribed level, a switchover is made from a starting mode to a running mode in which running mode self-commutation can be sustained. However, it is possible for an undesirable state to occur in this conversion procedure in which undesirable state the rotor of the motor 00 does not rotate in response to the rotating magnetic field induced by the application of three-phase excitation to the stator field coils, but slips back in phase exhibiting a phenomenon known as "cogging" which causes failure in building up of motor speed towards synchronous value.

The back electromotive force can be expressed according to the following equation.

$$V_{bemf} = -L \frac{d\phi}{dt}$$

The equation shows that a magnitude of back electromotive force depends on how rapidly the motor 00 is synchronised in starting mode. However, if a starting frequency is too high, the rotor of the motor 00 will not rotate. And, if a starting frequency is too low, the speed of rotation of the motor 00 rotor is low and the back electromotive force is small, so that switch-over from the starting mode to a running mode will not take place. As a result, although the motor is started by selecting a low enough frequency of initial excitation, the motor 00 cannot spin up to a desired synchronous speed.

The inventors perceived a need to provide a start-up circuit for a sensorless, brushless DC motor which increases the magnitude of a back electromotive force by selectively adjusting the rate of a starting clock during start-up of the motor so the starting clock can facilitate both a normal start-up with a normal-rate starting clock and an accelerating start-up up with a relatively accelerated-rate starting clock. This permits a stable and rapid start-up without the need for a microprocessor or complicated circuitry.

SUMMARY OF THE INVENTION

Start-up and run circuitry for a three-phase sensorless, brushless DC motor having a rotor and having a stator with three-phase field coils operates in a start-up mode or a running mode, and operates either in a normal submode or in an accelerating submode in said start-up mode. The start-up circuit is distinguished by an intermittently-accelerated-rate clock generator clock generator for generating a clock signal at a rate that is intermittently accelerated during start-up, the rate being a normal rate when operating in the normal submode of the start-up mode and being a relatively accelerated rate when operating in the accelerating submode of the start-up mode. A shift register, connected as a ring counter for generating a selected one of a three-phase commutation signal and a six-phase commutation signal for the brushless DC motor, is connected for having its shifts clocked by the intermittently-accelerated-rate clock signal. A back-electromotive-force signal amplifier responds to a non-excited-phase indication for selecting a back-electromotive-force signal generated in a currently non-excited one of the three-phase field coils of the motor and amplifies that selected back-electromotive-force signal to supply an amplified back-electromotive-force signal. A back-electromotive-force detector detects when the absolute amplitude of the amplified back-electromotive-force signal generated during start-up exceeds a prescribed threshold, to switch operation of the start-up circuit from start-up mode to running mode. A zero-crossing detector responds to the non-excited-phase indication for selecting an induced current signal or a back-electromotive-force signal generated in the currently non-excited winding of the motor, and infers a position of the motor rotor from the zero-crossing of that signal to generate rotor position information. A commutating and pre-driving circuit supplies response to the commutation logic signal supplied from the shift register, according to the rotor position information supplied from the zero-crossing detector; generates the non-excited-phase indications, and provides a pre-driving function. A three-phase driving output stage drives the three-phase stator field coils responsive to the response supplied from the commutating and pre-driving circuit.

In accordance with an aspect of the invention the intermittently-accelerated-rate clock generator comprises first and second oscillators each having a respective sawtooth oscillator portion. The first oscillator is for generating a control signal having pulses of a first predetermined pulse width separated by first intervals. The sawtooth oscillator portion of the first oscillator includes a first timing capacitor supplied a first current of a prescribed polarity during each of the first intervals and supplied a second current of opposite polarity to the first current and of prescribed amplitude during each pulse of the control signal. The second oscillator is for generating a clock signal having pulses of a second predetermined pulse width separated by second intervals, the periodicity of the second intervals having a relatively longer value during the first intervals and having a relatively shorter value during pulses of the control signal. The sawtooth oscillator portion of the second oscillator includes a second timing capacitor supplied a third current of a prescribed polarity and an adjustable amplitude during each of the second intervals and supplied a fourth current of opposite polarity to the third current and of a prescribed amplitude during each pulse of said clock signal. The amplitude of the third current is adjusted in accordance with the control signal, so as to have a first value during each pulse of the control signal and so as to have second value during each of the first intervals.

BRIEF DESCRIPTION OF THE DRAWING

FIG. 5 shows waveforms of output currents from a start-up circuit for sensorless, brushless DC motor using an intermittently-accelerated-rate clock in accordance with the present invention.

DETAILED DESCRIPTION OF THE PREFERRED EMBODIMENT

Figure 1:
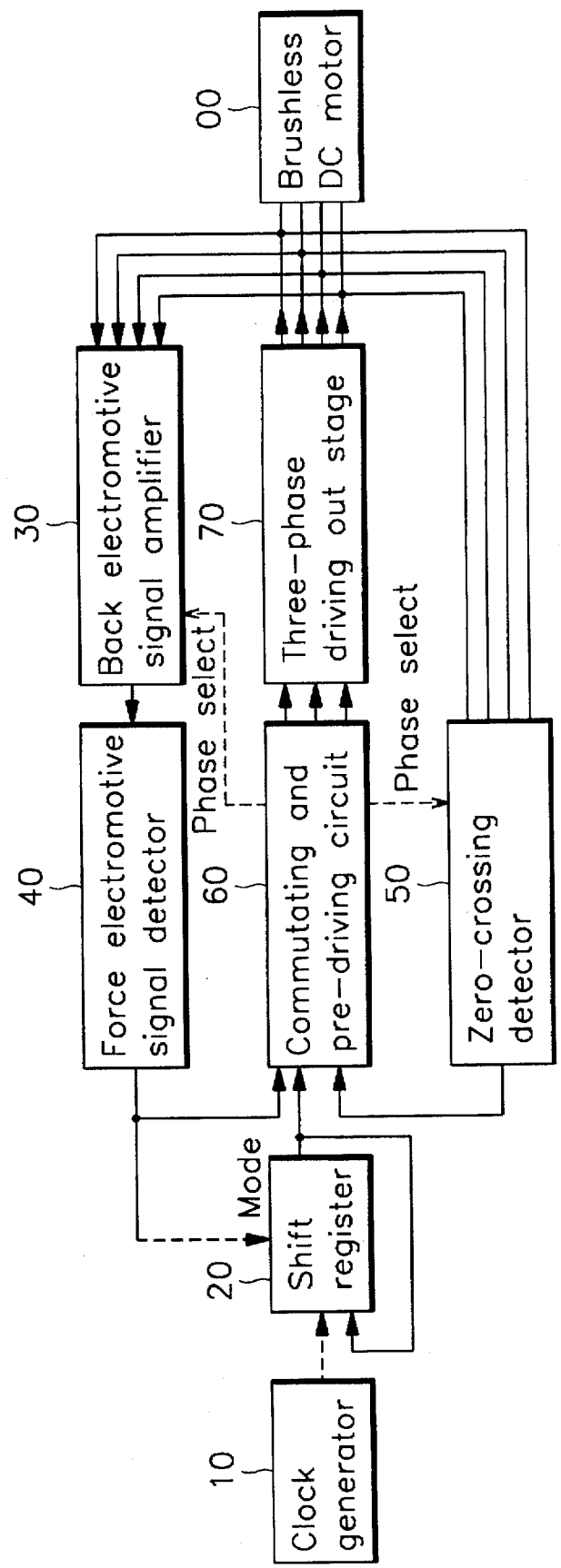
FIG. 1 is a block diagram illustrating a conventional start-up circuit for a sensorless, brushless DC motor.
Figure 2:
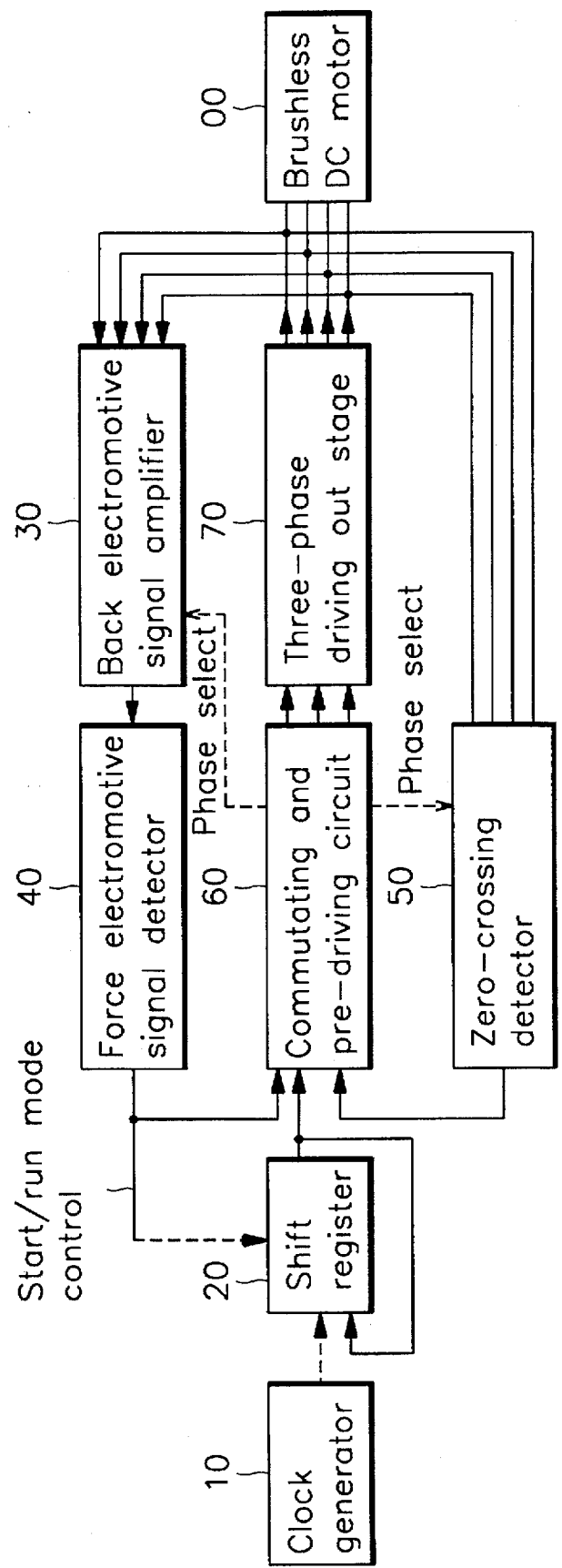
FIG. 2 is a block diagram illustrating a start-up circuit including an intermittently-accelerated-rate clock generator in accordance with the present invention.

Referring to FIG. 2, a start-up circuit for sensorless, brushless DC motor using an adjustable-rate clock in accordance with a preferred embodiment of the present invention includes an intermittently-accelerated-rate clock generator 100 for generating a clock having an intermittently accelerated pulse-rate; a shift register 20 connected as a ring counter and clocked by the clock of constant frequency supplied by the clock generator 100, for selectively generating a three-phase or a six-phase logic signal used to control commutation of the brushless DC motor 00 during start-up and during running, respectively; a back-electromotive-force signal amplifier 30 responsive to a non-excited-phase indication for selecting a back-electromotive-force signal generated in the currently non-excited winding of the motor 00 and amplifying that selected back-electromotive-force signal to supply an amplified back-electromotive-force signal; a back electromotive force detector 40 for detecting when the absolute amplitude of the amplified back-electromotive-force signal generated during start-up exceeds a prescribed threshold for switching commutation of the brushless DC motor 00 from start-up mode to running mode; a zero-crossing detector 50 responsive to the non-excited-phase indication for selecting an induced current signal or back-electromotive-force signal generated in the currently non-excited winding of the motor 00, and inferring a position of the motor rotor from the zero-crossing of that signal; a commutating and pre-driving circuit 60 for supplying response to the commutation logic signal supplied from the shift register 20 according to rotor position information supplied from the zero-crossing detector 50, for generating the non-excited-phase indications, and for providing a pre-driving function; and a three-phase driving output stage 70 for driving the stator field coils of the three-phase brushless DC motor responsive to output signal supplied from the commutating and pre-driving circuit 60. In a variant of the preferred embodiment shown in FIG. 2 the zero-crossing detector 50 infers the position of the motor rotor from the zero crossings of the amplified back-electromotive-force signal supplied from the back-electromotive-force signal amplifier 30.

Figure 3:
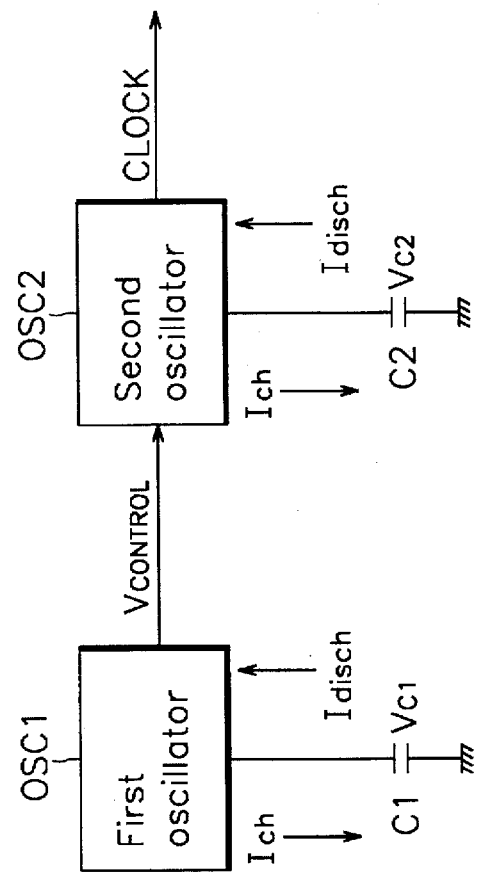
FIG. 3 is a circuit diagram of an intermittently-accelerated-rate clock generator in accordance with the present invention.

As shown in FIG. 3, the intermittently-accelerated-rate clock generator 100 includes a first oscillator OSC1 with an associated timing capacitor C1 and a second oscillator OSC2 with an associated timing capacitor C2. Both the oscillators OSC1 and OSC2 are of similar type, generating sawtooth oscillations across their respective timing capacitors in response to switched currents. The ratio of rise to fall times of the sawtooth oscillations of each of the oscillators OSC1 and OSC2 is determined by the ratio of charge current to discharge current of its respective timing capacitor; and the frequency of the sawtooth oscillations is determined by the capacitance of the capacitor and the magnitudes of the charge and discharge currents. The first oscillator OSC1 generates a clock signal $V_{CONTROL}$ that is used to control the periodicity of the pulses generated by the second oscillator OSC2.

The first oscillator OSC1 includes a first source of current for selectively charging the capacitor C1 and a second source of current for selectively discharging the timing capacitor C1. The first oscillator OSC1 generates a clock signal $V_{CONTROL}$ that is low when the first source of current is enabled to charge the capacitor C1 and that is high when the second source of current is enabled to discharge the capacitor C1. The amplitude of the voltage Vc1 appearing across the timing capacitor C1 is sensed by first and second level comparators. The first level comparator senses when the amplitude of that voltage Vc1 reaches a level indicative of a condition of maximum discharge to switch clock signal $V_{CONTROL}$ low and enable the first current source to charge the capacitor C1, and the second level comparator senses when the amplitude of that voltage Vc1 reaches a level indicative of a condition of maximum charge to switch clock signal $V_{CONTROL}$ high and enable the second current source to discharge the capacitor C1. The current supplied by the second source of current is fixed, so each time the clock signal $V_{CONTROL}$ pulses high it is high for a prescribed interval. The current supplied by the first source of current is fixed in the embodiment of the invention shown in FIG. 2, preferred when simplicity of operation is sought. In more complicated embodiments of the invention the current supplied by the first source of current is controlled in amplitude to adjust the rate at which clock signal $V_{CONTROL}$ pulses high, starting with an initially slow rate and increasing the rate as the motor 00 spins up toward synchronous speed for the running mode. The first source of current can be controlled in amplitude responsive to the absolute amplitude of the amplified back-electromotive-force signal in the non-excited motor 00 stator winding, as detected by the back electromotive force detector 40.

The second oscillator OSC2 includes a third source of current for selectively charging the capacitor C2 and a fourth source of current for selectively discharging the timing capacitor C2. The first oscillator OSC2 generates a clock signal CLOCK that is low when the third source of current is enabled to charge the capacitor C2 and that is high when the fourth source of current is enabled to discharge the capacitor C2. The amplitude of the voltage Vc2 appearing across the timing capacitor C2 is sensed by third and fourth level comparators. The third level comparator senses when the amplitude of that voltage Vc2 reaches a level indicative of a condition of maximum discharge to switch clock signal CLOCK low and enable the third current source to charge the capacitor C2, and the fourth level comparator senses when the amplitude of that voltage Vc2 reaches a level indicative of a condition of maximum charge to switch clock signal CLOCK high and enable the fourth current source to discharge the capacitor C2. The current supplied by the third source of current is controlled in amplitude responsive to the clock signal $V_{CONTROL}$, to adjust the rate at which clock signal CLOCK pulses high; and the current supplied by the FOURTH source of current is fixed, so each time the clock signal CLOCK pulses high it is high for a prescribed interval.

The intermittently-accelerated-rate clock generator 100 shown in FIG. 2 changes the rate of a starting clock generated in starting up a motor to achieve a normal start-up clock and an accelerating start-up clock.

Responding to the intermittently-accelerated-rate clock from an intermittently-accelerated-rate clock generator 100, the shift register 20 and the commutating and pre-driving circuit 60 together generate a commutation logic signal and form therefrom a signal having three-phases. A three-phase driving output stage 70 responds to these three-phase signals to drive the wye-connected stator field coils of the sensorless, brushless DC motor 00 via a four-wire connection with one wire providing wye common voltage return. A detailed circuit diagram showing the intermittently-accelerated-rate clock generator 100 is described in FIG. 3.

In the intermittently-accelerated-rate clock generator 100 shown in FIG. 3, the first oscillator OSC1 can determine both a charging time $T_{ch-osc1}$ and a discharging time $T_{disch-osc1}$ for the first capacitor C1 dependent on its capacitance C1, the charging current $I_{ch}$ supplied from the first current source, and the discharging current $I_{disch}$ supplied from the second current source. The combined charging time $T_{ch-osc1}$ and discharging time $T_{disch-osc1}$ determine the rate at which accelerating intervals will occur, and the discharging time $T_{disch-osc1}$ determines the duration of each accelerating interval. The charging and discharging times of the first oscillator OSC1 are described in the following equations, in which $\Delta V$ is the change in capacitor voltage between the discharge and charge states of the capacitor.

$$T_{ch\_osc1} = \frac{C1 \times DV}{I_{ch}} \quad (1)$$

$$T_{disch\_osc1} = \frac{C1 \times DV}{I_{disch}} \quad (2)$$

The output signal $V_{CONTROL}$ from the first oscillator OSC1 is a low-level signal during the charging time $T_{ch-osc1}$ of the first capacitor, and is a high-level signal during the discharging time $T_{disch-osc1}$ of the first capacitor.

The operation of the second oscillator OSC2 is similar to that of the first oscillator OSC1. The charging operation is slowly achieved when the output signal $V_{CONTROL}$ from the first oscillator OSC1 is at a low level during a normal start condition, so that a minimum charging current $I_{ch\_min}$ flows to the second capacitor C2. A charging operation is rapidly achieved when the output signal $V_{CONTROL}$ from the first oscillator OSC1 is at a high level during an acceleration condition, so that a maximum charging current $I_{ch\_max}$ flows to the second capacitor C2. Both the charging current and the discharging current can be expressed as following equations.

$$T_{ch\_osc2\_max} = \frac{C2 \times \Delta V}{I_{ch\_min}} \quad (3)$$

-continued $$T_{ch\_osc2\_min} = \frac{C2 \times \Delta V}{I_{ch\_max}} \quad (4)$$

$$T_{disch\_osc2} = \frac{C2 \times \Delta V}{I_{disch}} \quad (5)$$

where, $T_{ch\_osc2\_max}$ is a maximum charging time of the second oscillator, $T_{ch\_osc2\_min}$ is a minimum charging time of the second oscillator, $T_{disch\_osc2}$ is a discharging time of the second oscillator, C2 is a capacitance of the second capacitor, and $I_{disch}$ is a discharging current of the second capacitor.

Figure 4:
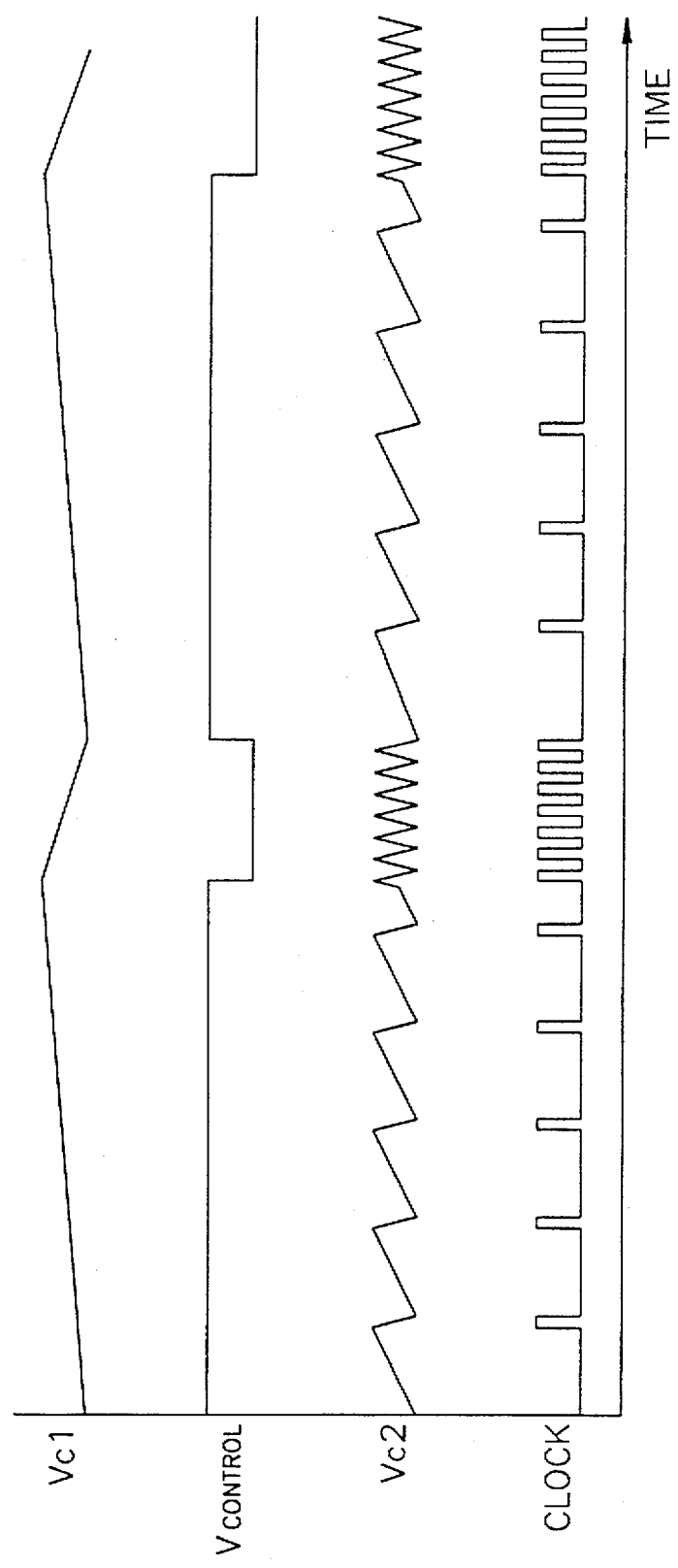
FIG. 4 shows waveforms of output signals from the intermittently-accelerated-rate clock generator in accordance with the present invention.

Referring to FIG. 4, the output clock CLOCK of the second oscillator OSC2 is rate-adjusted to achieve both a normal start-up and an accelerating start-up, and is used to clock ring counter operation in the shift register 20. The output signals from the successive stages of the shift register 20 are applied to the commutating and pre-driving circuit 60 controlling the three-phase driving output stage 70 that drives the stator field coils of the brushless DC motor 00. Alternatively, peak tips of the sawtooth wave which is generated from the charging and discharging currents of the second capacitor C2 can be detected and used as a clock signal for the shift register 20.

The waveforms of the currents applied to the stator field coils of the motor 00, the phases of which are synchronised to the clock CLOCK, are shown in FIG. 5. As shown in FIG. 5, a start-up circuit performs a normal start-up during a normal starting period T0. However, when insufficient back electromotive force is generated by the motor, the start-up circuit sets an accelerating starting period T1, and raises the rotating speed of the motor rotor by increasing the rate of stator field coil excitation during the accelerating starting period T1. As a result, the back electromotive force is increased.

If a motor is initially operated with the rate of stator field coil excitation used in the accelerating starting period T1, the probability is high that the rotor of the motor will not rotate. However, the start-up circuit overcomes static friction by rotating the motor with the normal start-up frequency during the normal starting period T0, and then accelerates the stator field coil excitation rate during the accelerating starting period T1, thereby increasing the speed of rotation of the motor rotor. Also, since this process is repeated several times, the probability of failure is substantially lowered.

Accordingly, a start-up circuit for sensorless, brushless DC motor constructed in accordance with the invention increases a magnitude of a back electromotive force by adjusting the rate of a starting clock in starting up the motor to be capable of both a normal start-up and an accelerating start-up. The use of the intermittently-accelerated-rate clock generator achieves a stable and rapid start-up without need for a microprocessor or complicated circuitry.

What is claimed is:

1. A start-up circuit for a sensorless, brushless DC motor having a rotor and having a stator with three-phase field coils, said start-up circuit operating in a start-up mode or a running mode, operating in said start-up mode either in a normal submode or in an accelerating submode, and comprising:

an intermittently-accelerated-rate clock generator clock generator for generating a clock signal at a rate that is intermittently accelerated during start-up, said rate being a normal rate when operating in said normal submode of said start-up mode and being a relatively accelerated rate when operating in said accelerating submode of said start-up mode;

a shift register, connected as a ring counter for generating a selected one of a three-phase commutation signal and a six-phase commutation signal for said brushless DC motor, said shift register connected for having its shifts clocked by said intermittently-accelerated-rate clock signal;

a back-electromotive-force signal amplifier responsive to a non-excited-phase indication for selecting a back-electromotive-force signal generated in a currently non-excited one of said three-phase field coils of the motor and amplifying that selected back-electromotive-force signal to supply an amplified back-electromotive-force signal;

a back electromotive force detector for detecting when the absolute amplitude of the amplified back-electromotive-force signal generated during start-up exceeds a prescribed threshold, to switch operation of said start-up circuit from start-up mode to running mode;

a zero-crossing detector responsive to said non-excited-phase indication for selecting one of an induced current signal and a back-electromotive-force signal generated in the currently non-excited winding of the motor, and inferring a position of the motor rotor from the zero-crossing of that signal to generate rotor position information;

a commutating and pre-driving circuit for supplying response to the commutation logic signal supplied from the shift register according to said rotor position information supplied from said zero-crossing detector, for generating said non-excited-phase indications, and for providing a pre-driving function; and a three-phase driving output stage for driving said three-phase stator field coils responsive to said response supplied from the commutating and pre-driving circuit.

2. A start-up circuit as set forth in claim 1, wherein said intermittently-accelerated-rate clock generator comprises:

a first oscillator for generating a control signal having pulses of a first predetermined pulse width separated by first intervals, said first oscillator having a sawtooth oscillator portion including a first timing capacitor supplied a first current of a prescribed polarity during each of said first intervals and supplied a second current of opposite polarity to said first current and of prescribed amplitude during each pulse of said control signal;

a second oscillator for generating a clock signal having pulses of a second predetermined pulse width separated by second intervals, the periodicity of said second intervals having a relatively longer value during said first intervals and having a relatively shorter value during pulses of said control signal, said second oscillator having a sawtooth oscillator portion including a second timing capacitor supplied a third current of a prescribed polarity and an adjustable amplitude during each of said second intervals and supplied a fourth current of opposite polarity to said third current and of a prescribed amplitude during each pulse of said clock signal, the amplitude of said third current being adjusted in accordance with said control signal to have a first value during each pulse of said control signal and to have second value during each of said first intervals.

* * * * *